March 15, 1960 YOSHIRO HATTORI 2,928,313

APPARATUS FOR PHOTOGRAPHING AND PROJECTING A MOTION PICTURE IMAGE OF A VERY WIDE ANGLE

Filed Sept. 5, 1957 2 Sheets-Sheet 1

United States Patent Office 2,928,313
Patented Mar. 15, 1960

1

2,928,313

APPARATUS FOR PHOTOGRAPHING AND PROJECTING A MOTION PICTURE IMAGE OF A VERY WIDE ANGLE

Yoshiro Hattori, Okayama-Shi, Okayama-Ken, Japan

Application September 5, 1957, Serial No. 682,140
Claims priority, application Japan September 7, 1956
5 Claims. (Cl. 88—16)

This invention relates to apparatus for photographing and projecting a motion picture film having an angle of vision of up to 360°, and more particularly to such apparatus which enables the achievement of the above function by employing only one machine and one film.

Various types of motion picture systems have been proposed for photographing and projecting a motion picture film having a wide angle of vision, these may be classified in general in two categories. These known systems have various disadvantages.

In the one system, only one machine and one film are used as in the present invention, but the angle of vision is limited to less than 100°. Moreover, it is necessary to use an anamorphic lens in this system thereby bringing about an undesirable effect on the picture produced through the enlargement in one direction of irregularities or grains present on the surface of a film. It is another defect of this system that the image obtained is distorted, particularly in the marginal portion thereof.

A second known system eliminates some of the disadvantages of the first mentioned system and enables the obtaining of an image of much wider angle without the defects of a system using an anamorphic lens. This second system, however, has its own disadvantages. First of all, it is necessary to use a number of machines with a corresponding number of films in order to obtain a scene of a wide angle of vision. The use of many machines and films makes it necessary to interconnect them so that appropriate synchronous operations are obtained. The interconnection of many machines is complicated and it is evident that the cost of the apparatus and operation is greatly increased compared with a system using only one machine and one film. Moreover, the picture projected by this system is not continuous but composed of several sections, and consequently it has seams or joints. The portion of a picture in the vicinity of the edge of each section is not generally distinct because of the aberration of light. Accordingly the picture projected on a screen by the second system is also not satisfactory.

An object of this invention is to provide an apparatus which eliminates all the disadvantages of the known systems as described above.

According to this invention, only one machine and one film is employed for photographing and projecting a motion picture film of a wide angle of vision and consequently the arrangement is economical.

The apparatus of this invention has a fixed cylindrical member on which a film is held and an optical system which rotates around the central axis of said fixed cylindrical member and transmits light rays from an object to an unexposed film held on the cylindrical member, or light rays coming through a film held on the cylindrical member to a screen.

According to this invention, it is possible to obtain a continuous seamless motion picture which has a wide angle of vision with practically no distortion of image.

2

The characteristics and advantages of the invention will be more clearly understood from the explanation made hereunder with reference to accompanying drawings which illustrate some embodiments of the present invention but do not limit the invention to the particular embodiments as illustrated.

Figure 1:
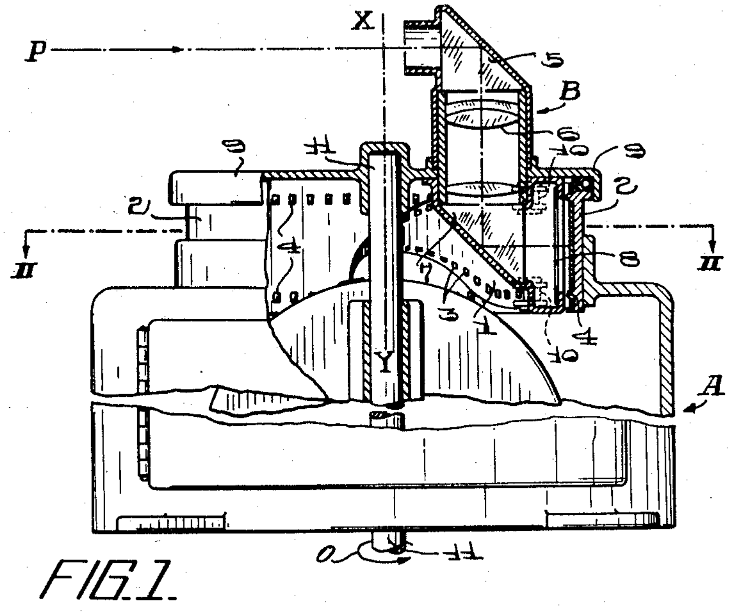
Fig. 1 is a diagrammatical side view partly in section of an apparatus for taking a motion picture film of a 360° scene according to this invention.
Figure 2:
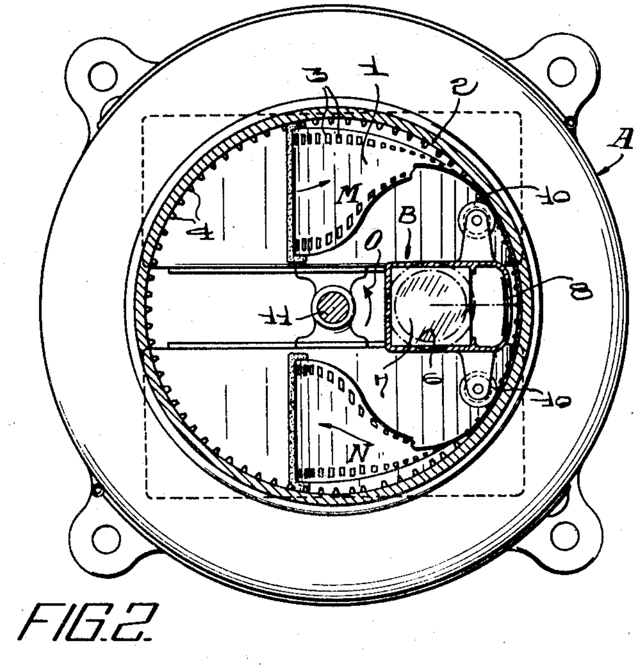
Fig. 2 is a sectional plan view taken along line II—II of Fig. 1.

In Figs. 1 and 2, an unexposed film 1 is mounted on the inside circumferential surface of a cylindrical member 2 by means of perforations 3 on the edges of the film 1 engaging with registering projections 4 provided on the inside surface of said cylindrical member 2. The cylindrical member 2 is fixed in a horizontal position on a camera generally shown by A. An optical system generally shown by B and comprising a mirror 5 inclined at an angle of 45°, a lens unit 6, another mirror 7 inclined again at an angle of 45° but in opposite direction, a slit 8, a top cover 9 and film pressing rollers 10 is rotatably mounted on a shaft 11 which passes through the center of the camera A. The light rays coming from an object P enter into the optical system B and, after being reflected by the mirror 5, pass through the lens unit 6 and are reflected again by mirror 7 to reach a film 1 held on the internal surface of the cylindrical member 2 facing the slit 8 of the optical system B through which the reflected light rays come. It is of course possible to use prisms for the mirrors 5 and 7 for achieving the same purpose. It will be understood that the slit 8 serves to minimize the deformation or aberration of the image by limiting the width of light ray beam which acts on the film 1. It is also to be noted that the optical axis of the lens unit 6 may be positioned at any position on a horizontal radial line passing through the center of the shaft 11 and may coincide with the central axis X—Y of said shaft. The film 1 is fed onto the surface of the member 2 in the direction M from a supply reel or source of unexposed film and is passed in the direction N after having been exposed to light to be wound on a take-up reel. The optical system B as a whole is rotated in the direction O which is opposite to the direction of the movement of the film 1. It will be clear that the portion of film which comes to the position confronting the slit 8 of the optical film is exposed to light rays to form an image thereon, and fresh unexposed portions of the film are brought successively onto the inside surface of the cylindrical member 2 to be exposed to the light from the rotating optical system B. The rotation of the optical system B is at a constant speed, for example, 16 r.p.s., and the film is delivered accordingly. The reel for feeding unexposed film and the reel for winding exposed film are arranged to rotate around the central axis together with the optical system so that smooth delivery and winding of the film can be attained. The film pressing rollers 10, 10 are also rotated similarly together with the optical system B.

According to this invention, there will be no necessity of moving the film intermittently and of using a shutter to shield the film from light intermittently as is the case with conventional apparatus. This is one of the features of this invention.

It is also evident from the above explanation that a complete circumferential scene of an angle of 360° is obtained at every revolution of the optical system, for example every one sixteenth of a second if the speed of rotation is 16 r.p.s. Moreover, said picture is seamless and continuous. In fact, a seamless image of the whole circumferential angle of vision is continuously and repeatedly formed on the film. This is another important feature of the present invention.

When this film is projected by a projector according to the principle of the invention a seamless scene of the whole circumferential angle of vision can be obtained on a screen. In this occasion, it is of course necessary to reverse the direction of light from that in photographing.

Figure 3:
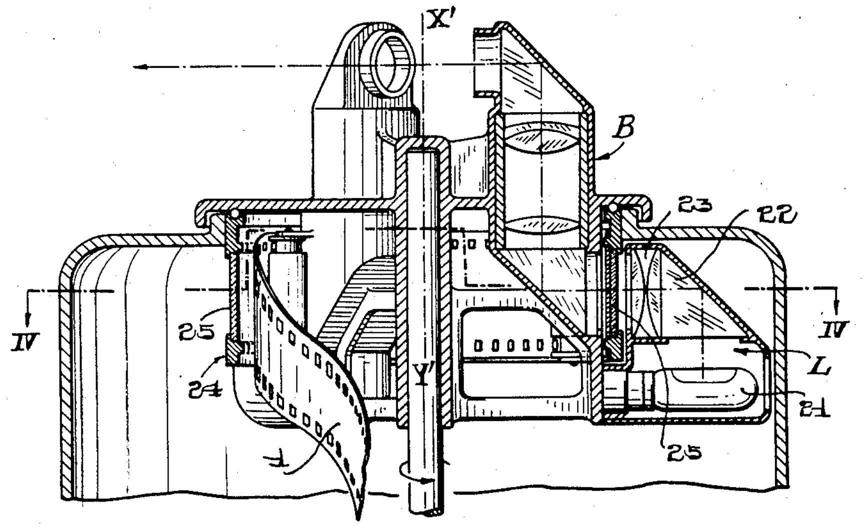
Fig. 3 is a diagrammatical side view of an apparatus for projecting a motion picture film of a 360° scene according to this invention.
Figure 4:
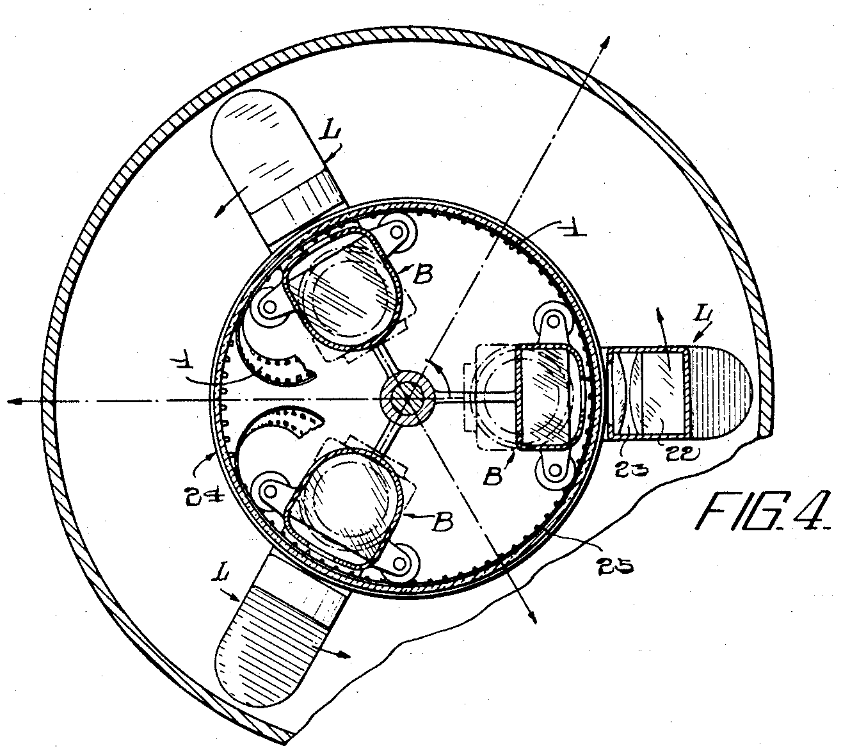
Fig. 4 is a sectional plan view of the apparatus of Fig. 3 partially broken away and taken along line IV—IV of Fig. 3.

Figs. 3 and 4 illustrate an embodiment for such a purpose. In general, it may be said that it is sufficient if the direction of light is reversed from the direction in the apparatus for photographing a motion picture film. However, there are some points to be specially considered in connection with projection. Accordingly these points will be explained in the following.

For a projector, a light source is required.

In Figs. 3 and 4, a light source system is generally shown by L and comprises a light source 21 which may be an electric bulb, an arc lamp or any other suitable light source, a prism 22, and a condenser 23.

A fixed cylindrical member 24 supporting a film (1) which corresponds to cylindrical member (2) of Figs. 1 and 2 must have a zone 25 of a width of the image of the film which allows the passage of light and is made of transparent material such as glass. It is preferable to provide more than one optical system B in order to increase the luminous intensity of the image on a screen and to minimize the sparkling of said image together with corresponding number of light source systems.

In the embodiment illustrated, three optical systems and light source systems are employed. A screen is not shown but it will be understood that a screen is arranged around the center line X', Y' of the projector at a proper distance and is of a complete cylindrical form. The light source system L is provided for each of the optical systems B and they are fixed with one another so that all the optical systems and all the light source systems constitute one unit rotatable around the central axis X'—Y'. When the combined unit is rotated at a speed which is the same as that of photographing the motion picture film to be projected, light emitted from the light source L passes through the film and is projected to the screen after being reflected by the optical system B.

During this operation, the film is of course fed onto the surface of the fixed cylindrical member from one reel and is passed after being employed in association with the optical systems to a second reel to be wound thereon. The reels of the film are fixed on the unit comprising the optical systems and the light source systems as in the case of photographing.

It will be evident that an image covering all the cylindrical surface of the screen can be obtained by the apparatus and the operation described above.

If it is desired to obtain a scene of a limited angle such as, for example, an angle of 180°, this can be easily attained by simply covering the remainder of the circumference to shut off light therefrom.

As explained in the above, this invention provides a novel motion picture system which makes it possible to photograph and project motion picture film on which is a scene of the whole circumferential angle of vision or any desired angle of vision while employing only one machine and one film.

The picture obtained by this invention is continuous and has no seam or joint. There is little distortion or deformation of the image in photographing and projecting. The result obtained is much superior to those of heretofore known systems. Nevertheless the construction of the apparatus is very simple and inexpensive.

What is claimed is:

1. A projector for a motion picture having a viewing angle of 360°, said projector comprising a fixed cylindrical member including a plurality of inwardly extending projections adapted to engage perforations of a film to keep the film in a predetermined position on the inside surface of said cylindrical member and having a light permeable zone to allow the passage of light, a light source outside of the cylindrical member for directing light via said zone to the film, the width of said zone being at least equal to the width of the film, a light source system including said light source and further including reflectors and lenses operatively associated with and transmitting light from the light source to the film and an optical system rotatable around the axis of the cylindrical member and including reflectors and lenses to transmit light passing through the film to a screen arranged around the projector, and means for delivering the film to the fixed cylindrical member continuously at a speed corresponding to the speed of the rotation of the optical system.

2. A projector according to claim 1, comprising a plurality of optical systems including the first said optical system and a corresponding number of light source systems including the first said light source system, said systems increasing the luminous intensity of the image on a screen and avoiding flickering of the said image.

3. A system for photographic operations on film, comprising a fixed cylinder defining a central opening, projections on the cylinder and extending inwardly into the opening for guiding the film, a shaft in the opening coaxial with the cylinder, a film source and film take-up for the supply and removal of film to and from the projections, the source and take-up being rotatable on the shaft, a light source rotatable on the shaft and externally of the cylinder, the sources and take-up being relatively fixed to provide for like rotational speeds, and an optical system rotatable with the light source for directing light onto the film.

4. A system as claimed in claim 3, constituting a camera and wherein the light source comprises lens means for scanning a subject to be photographed.

5. A system as claimed in claim 4, constituting a projector and wherein the light source comprises a light bulb for supplying a light beam to the film.

References Cited in the file of this patent

UNITED STATES PATENTS

| | | |
|---|---|---|
| 2,794,379 | McNeil | June 4, 1957 |
| 2,815,701 | Back et al. | Dec. 10, 1957 |

FOREIGN PATENTS

| | | |
|---|---|---|
| 129,646 | Germany | Apr. 16, 1902 |
| 327,058 | France | Dec. 6, 1902 |